Aug. 28, 1956   A. W. KORB   2,760,243
METHOD OF JOINING MATERIALS AND JOINT OBTAINED THEREBY
Filed July 17, 1951
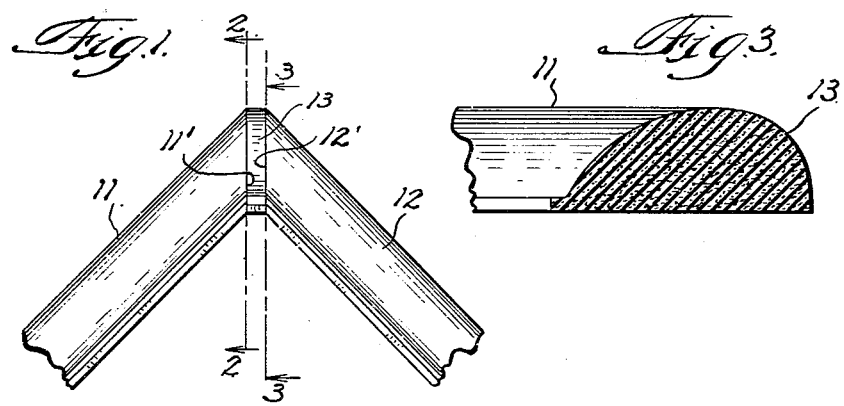
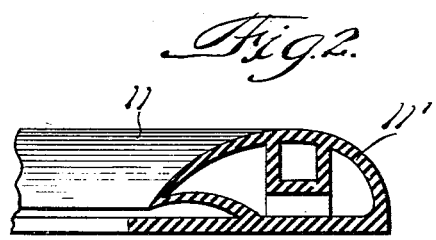
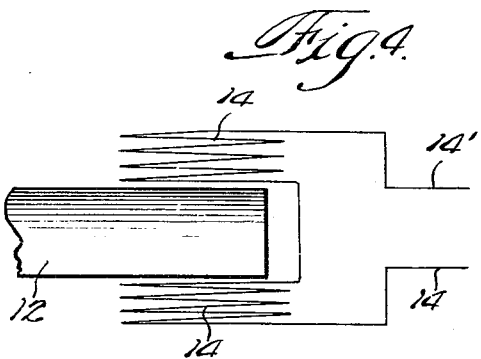
INVENTOR.
Anton W. Korb

# United States Patent Office 2,760,243
Patented Aug. 28, 1956

2,760,243

METHOD OF JOINING MATERIALS AND JOINT OBTAINED THEREBY

Anton W. Korb, Grandville, Mich., assignor to Jervis Corporation, Grandville, Mich., a corporation of Michigan Application July 17, 1951, Serial No. 237,260

5 Claims. (Cl. 20—69)

This invention relates to an improved method of joining materials, and to a joint obtained thereby and, more particularly, as applied to elastomers, for example those generally employed in the construction of a refrigerator sealing gasket. It is an object of the invention to provide an improved method of that character and an improved joint obtained thereby.

As indicated above the invention is particularly applicable to but is not limited to elastomeric materials. According to the prior art, joints between portions of goods of such materials are accomplished most frequently by holding such portions in their desired relative positions and subjecting the assembly to heat, and in some instances pressure, to cause what is generally termed a heat sealing. Such a process frequently causes distortion of the portions which are being joined and is otherwise an operation which requires great care in order to insure a good joint while at the same time avoiding serious damage to the portions of goods being joined. This is particularly true where the cross-sectional area of the proposed joint is small or of fine configuration.

According to one embodiment of the invention, an elastomeric spongy substance, for example sponge rubber, is placed between and in contact with the surfaces to be joined, the sponge rubber having included therein a mineral or carbonaceous deposit which is magnetic, or electrically conducting, or both. Such a material is responsive to indirect, electrically induced heating. For example, conducting plates may be arranged at opposite sides of the material and a high frequency voltage of substantial magnitude connected to the plates. The strong, rapidly alternating electrostatic field produced in the neighborhood including the sponge rubber will cause heating of the material by induced current flow as well as by dielectric effect. An induction heating process involving electromagnetic coils carrying high frequency current will also be effective by virtue of eddy current and/or hysteresis losses induced in the material. The sponge rubber thereby becomes, in effect, responsive to indirect, electrically induced heating since the heat generated in the deposit is quickly transferred to the rubber itself.

Such indirect heating may then be employed to raise the sponge rubber, for example, to a temperature at which it becomes tacky, whereupon it adheres tightly to the faces of the goods being joined. The spongy characteristic of the substance causes adherence at a very large number of closely-spaced points with the result that a very firm bond is secured. In this regard it should be noted that a very fine cell structure is desirable in the spongy substance.

This method and the joints obtained through the use thereof have the advantage, particularly as applied to the joining of elastomeric materials, that the heat is confined substantially to the spongy substance and to a very slight depth of the portions of the goods being joined along the contacting faces or edges thereof. Permanent distortion of the goods being joined is thereby substantially eliminated while at the same time a very firm bond is assured.

Furthermore, the process is one which is readily controlled. Still further it necessarily produces substantially uniform heating of the entire bulk of the spongy substance and of the entire contacting surfaces or edges of the goods being joined.

Accordingly, it is another object of the invention to provide an improved joint in goods of elastomeric material which is effective throughout substantially the entire surface of the joint and in which the goods remain substantially undistorted.

It is another object of the invention to provide an improved method for joining portions of goods of elastomeric material which is effective throughout substantially the entire surface of a joint and which causes little if any distortion of the goods being joined.

This invention, together with further objects and advantages thereof, will best be understood by reference to the following description taken in connection with the accompanying drawing, and its scope will be pointed out in the appended claims.

In the drawing, in which like parts are designated by like reference numerals,

Fig. 1 is a partial plan view of a refrigerator door gasket assembly prior to the performance of the joining operation;

Fig. 2 is a cross-sectional view of the gasket disclosed in Fig. 1, taken along the line 2—2 of that figure;

Fig. 3 is a cross-sectional view taken along the line 3—3 of Fig. 1, showing the right-hand face of the piece of joining sponge rubber disclosed in said figure; and Fig. 4 is an elevational view of the assembly disclosed in Fig. 1 shown in conjunction with a schematic representation of induction heating apparatus for causing the sealing of the sponge rubber section to the adjoining surfaces or edges of the gasket portions.

The invention has been found to be of advantage in the manufacture of sealing gaskets for refrigerator doors and it is disclosed herein in such an application. In Fig. 1 there are shown two sections 11 and 12 of a refrigerator sealing gasket which is of elastomeric material, for example rubber or soft plastic, the adjacent ends of the two gasket portions 11 and 12 having matching bevelled faces 11' and 12'. In the manufacture of a sealing gasket for a refrigerator door, it is desirable that these bevelled faces be joined in some manner to form a right angle corner, and, most frequently, four such gasket portions are ultimately joined end-to-end to form a continuous sealing gasket of rectangular formation.

As has been suggested above, the matching faces 11' and 12' of the gasket portions 11 and 12 are, in accordance with the prior art, connected directly to each other. This may be accomplished by heating the surfaces to be joined to such a temperature that the surfaces are tacky after which the surfaces are held together to effect a joint. One disadvantage of such a process and of the joint obtained thereby is that the surfaces to be joined are likely to be heated unevenly with the result that good adhesion may not be obtained over the entire surface thereof. Another disadvantage of such a process is the criticalness with which it must be controlled. This follows from the fact that a slight overheating of the ends of the gasket will cause distortion of adjacent portions of the gasket with the result, for example, of faulty sealing of the refrigerator on which the gasket is employed. An adhesive is sometimes employed to join two pieces of elastomeric material but this is generally unsatisfactory where the contact surface is small, because of the lack of strength of the joint.

In accordance with one embodiment of the invention a sheet 13 of sponge rubber is inserted between the matching surfaces 11' and 12' of the gasket portions. This sheet of sponge rubber contains a mineral or carbonaceous deposit or film in the cell structure thereof. Such a deposit or film may be obtained readily by various methods. In one, the gassing element used in the production of the sponge rubber may have suspended therein particles of mineral or carbonaceous material, which particles will ultimately be disposed primarily as a deposit or film on the surfaces of the individual minute cells in the sponge rubber. Alternatively, colloidal graphite or mineral particles may be suspended in the fluid carrier forming a part of the mixture from which the sponge rubber is made. In such case the mineral or carbonaceous particles may be embedded in the rubber, or deposited ultimately on the surfaces of the individual cells of the sponge rubber.

In any event the presence of the minute particles of electrically conducting and/or magnetic material or materials throughout the sponge rubber sheet 13 makes the combination responsive to indirect, electrically induced heating. Where electrical current flow is relied upon, whether in the form of eddy currents in an induction heating process, or in the form of current produced by a rapidly alternating electrostatic field, the particles are preferably of low resistance. Where a magnetic response is relied upon as in induction heating, the particle material is preferably one having high hysteresis loss. If, then, the assembly disclosed in Fig. 1 is subjected to an indirect, electrically induced heating, for example an inductive heating process, the temperature of the sponge rubber sheet will rise, as will readily be understood by those skilled in the art, while the gasket portions 11 and 12 will not be directly affected thereby since they are relatively unresponsive to either a rapidly alternating magnetic field or a rapidly alternating electrostatic field. Heat will, however, be transferred by conduction from the sponge rubber sheet 13 to the abutting surfaces 11' and 12' of the gasket portions. If the temperature of the sponge rubber is raised rapidly to a temperature at which it becomes tacky, the heat will not have time to penetrate the gasket to any substantial depth. Accordingly, the surfaces 11' and 12' of the gasket will become tacky, along with the entire bulk of the sponge rubber, to provide a good joint, while the main body of the gasket will remain substantially unaffected and hence undistorted by the heat.

Since the sponge rubber sheet 13 is very flexible it may readily be brought into contact with all portions of the gasket surfaces 11' and 12'. Because of this uniform contact between the sponge rubber and the gasket surfaces and because all portions of the sponge rubber may be raised rapidly and uniformly to the desired temperature, a very firm seal can be obtained over the entire area of the surfaces 11' and 12' without any of the destructive effects, such as gasket distortion, which necessarily accompany excessive or prolonged heating of the gasket itself.

The joint formed by the method described is actually a seal, the materials of the gasket and the sponge rubber blending into each other to form an integral structure.

One form of refrigerator gasket to which the invention is particularly applicable has a cross section such as that illustrated in Fig. 2. The invention is particularly applicable to gaskets of the general character disclosed in Fig. 2 because of the difficulty which is encountered in joining the relatively thin edges of such a gasket by previously known methods. It will be apparent that when a sheet of sponge rubber is employed of the shape illustrated in Fig. 3, exact alignment of the gasket portions is not essential since both gasket surfaces 11' and 12' are secured to the sponge rubber sheet rather than directly to the opposed gasket end. Where a direct joint is attempted, extremely accurate positioning of the two gasket ends is necessary since any slight deviation from true alignment will materially affect the amount of edge surface available to form the joint. In any event, the surface presented to form the joint is small with the result that a very firm joint is essential to obtain the requisite strength.

The means for accomplishing the indirect electrical heating of the joint, whether it be by magnetic or electrostatic field, and in particular for heating the sponge rubber sheet 13, may be of any suitable form. In Fig. 4 there is illustrated schematically induction heating apparatus including a pair of coils 14, the leads 14' of the coils being connected to any suitable source of alternating current. The alternating current is preferably of a high frequency, for example one which may be classified as radio frequency. Since the particular form of the means for accomplishing heating of the sponge rubber sheet 13 is not in itself a part of the invention and since it may be of any suitable form, it is not described in detail herein.

As indicated above it has been found that the invention is well adapted to application in the production of refrigerator door gaskets, partly, at least, because of the special need for substantially undistorted gasket dimensions and because of the small surface available at the ends of the gasket to be joined. The invention, however, is adapted to many other applications, wherein the two conditions referred to immediately above may or may not prevail. More specifically, the strength of the joint and the ease of controlling the temperature make this invention applicable to many cases in which materials are to be joined which are unresponsive to induction heating.

In the specific embodiments of the invention illustrated and described above it is preferable that a sheet of sponge rubber 13 be employed. It is to be understood, however, that the invention is not limited either to a spongy substance or to rubber. More specifically the sheet 13 may be either solid or spongy in character and may be composed of any material which has a reasonably low melting point and which is responsive to indirect, electrically induced heating. It is to be noted particularly that the latter characteristic may be inherent in the material or may be obtained by the inclusion therein of some form of mineral or carbonaceous deposit as in the embodiment described above.

The element 13 has furthermore been described above as sheetlike in form. This form is considered preferable in the application in which the invention has been described since the sponge rubber is intended to serve only to form the joints, it being desired that the final product comprise the gasket illustrated in Fig. 2 to as great an extent as possible. In other applications, however, it may be desired that alternate, extensive sections of a final product be responsive to indirect, electrically induced heating, and such an arrangement lies within the scope of the invention.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. The method of sealably joining opposed sections of elastomeric material which comprises interposing therebetween a thin sheet of spongy elastomeric material having distributed therethrough means responsive to induction heating, and fusing said interposed material by induction heating to join said opposed sections.

2. The method of joining opposed ends of refrigerator door sealing gasket sections which comprises interposing therebetween a thin sheet of sponge rubber having particles of material distributed therethrough which are responsive to introduction, heating, and fusing said interposed material by induction heating to join said opposed ends of said gasket sections.

3. The method of joining opposed ends of refrigerator door sealing gasket sections which comprises interposing therebetween a thin sheet of sponge rubber having particles of carbonaceous material distributed therethrough, and fusing said sponge rubber by induction heating to join said opposed ends of said gasket sections.

4. A refrigerator door sealing gasket assembly including two sections of refrigerator door sealing gasket having opposed ends, and a thin sheet of spongy elastomeric material affixed at opposite surfaces thereof to respective opposed ends of said gasket sections by induction heating, said spongy elastomeric material including therein and distributed therethrough particles of material responsive to induction heating.

5. A refrigerator door sealing gasket assembly including two sections of refrigerator door sealing gasket having opposed ends, and a thin sheet of sponge rubber affixed at opposite surfaces thereof to respective opposed ends of said gasket sections by induction heating, said sponge rubber having distributed therethrough particles of carbonaceous material.

References Cited in the file of this patent

UNITED STATES PATENTS

| | | |
|---|---|---|
| 1,813,425 | Rosaire | July 7, 1931 |
| 1,899,067 | Trumbull | Feb. 28, 1933 |
| 2,278,756 | Wright | Apr. 7, 1942 |
| 2,407,833 | Jablonsky | Sept. 17, 1946 |
| 2,476,283 | Castellan | July 19, 1949 |
| 2,480,631 | Cage | Aug. 30, 1949 |
| 2,571,259 | Kusiak | Oct. 16, 1951 |